(12) United States Patent
Fournier et al.

(10) Patent No.: US 6,256,979 B1
(45) Date of Patent: Jul. 10, 2001

(54) BACKBLAST GAS STRUCTURE EQUIPPED WITH THRUST REVERSER WITH TWO REAR DOORS AND PLANAR EXHAUST AREA

(75) Inventors: Alain Fournier, Le Plessis Robinson; Robert Standish, Gazeran, both of (FR)

(73) Assignee: Societe de Construction des Avions Hurel-Dubois (Societe Anonyme), Meudon-la-Foret (FR)

(*) Notice: Subject to any disclaimer, the term of this patent is extended or adjusted under 35 U.S.C. 154(b) by 0 days.

(21) Appl. No.: 09/445,073

(22) PCT Filed: May 20, 1998

(86) PCT No.: PCT/FR98/01002

§ 371 Date: Dec. 2, 1999

§ 102(e) Date: Dec. 2, 1999

(87) PCT Pub. No.: WO98/55754

PCT Pub. Date: Dec. 10, 1998

(30) Foreign Application Priority Data

Jun. 3, 1997 (FR) .................................................. 97 06780

(51) Int. Cl.[7] ...................................................... F02K 3/02
(52) U.S. Cl. .................................. 60/226.2; 239/265.37; 244/110 B
(58) Field of Search ..................... 60/226.2; 239/265.37; 244/110 B

(56) References Cited

U.S. PATENT DOCUMENTS

| | | |
|---|---|---|
| 4,147,027 | 4/1979 | Greathouse . |
| 5,390,879 | 2/1995 | Lair . |

FOREIGN PATENT DOCUMENTS

| | | |
|---|---|---|
| 0 774 578 | 5/1997 | (EP) . |
| 2 601 077 | 1/1988 | (FR) . |
| 2 697 292 | 4/1994 | (FR) . |
| 2696212A1 | * 4/1994 | (FR) . |

* cited by examiner

*Primary Examiner*—Charles G. Freay
*Assistant Examiner*—Eric D. Hayes
(74) *Attorney, Agent, or Firm*—Young & Thompson

(57) ABSTRACT

The invention concerns a backblast gas structure for jet engine comprising a thrust reversal system with two downstream doors. The invention is characterized in that the two tilt-up doors articulated about axes (6, 7) are mounted on two side beams (2, 3) with free downstream edges (16, 17) comprising protuberances (18, 19). The door downstream edges (13, 14) having median zones (13b, 14b) forming an angle (A) with the lateral parts (13a, 14a), such that when the doors are in retracted position in direct jet, the beam (13b, 14b) edges (16, 17) of the doors are found in the same plane (P2), thereby constituting a gas exhaust outlet which is planar and substantially circular. The invention aims at improving the power package performance in direct jet.

3 Claims, 6 Drawing Sheets

BACKBLAST GAS STRUCTURE EQUIPPED WITH THRUST REVERSER WITH TWO REAR DOORS AND PLANAR EXHAUST AREA

The present invention relates to a gas-ejection structure for jet engines and more particularly for aircraft engines of the bypass type, that is to say those equipped with a fan situated upstream of the engine and providing for a cold-air current to flow in an annular channel formed between an outer cowling and an axial nozzle for ejecting the flow of hot propulsion gases, the cold and hot flows flowing out and then being mixed in a downstream passage of substantially circular cross-section.

More specifically, the invention relates to an ejection structure of the type indicated above incorporating a thrust-reverser system including two doors each having an upstream edge and a downstream edge, by reference to the direction of flow of the gases, the said doors being arranged downstream and each being mounted pivoting about axes of articulation between a stowed position (not interfering with the ejection of the gases in forward-thrust mode) in which, in association with two fixed lateral beams which are symmetric with respect to the axis of the engine, they contribute to defining the said outer cowling, and a deployed position (causing the thrust reversal) in which the said doors clear a passage in the cowling for reversal of the gases while blocking off the channel, the two lateral beams, onto which the said doors are articulated, forming part of a fixed structure and including downstream ends which are independent and spaced apart from one another.

A reverser assembly of this type is already known from the French patent No 2 382 594, filed on Mar. 4, 1977. However, whereas it completely fulfils its role of deflecting the flow of gases and thus of effective braking in doors-deployed position, the reverser assembly described in this prior patent exhibits a certain number of drawbacks. This is because, in this patent, on the one hand, the axes of articulation of the doors are situated at the end of narrow lateral beams and, on the other hand, the downstream edges of the doors, which, in doors-stowed position, or "forward thrust" position, are in inclined planes with respect to the longitudinal axis of the engine, form a V-shaped or "fish's mouth" section between them, which is prejudicial to the efficiency of the engine in forward-thrust mode and does not correspond to the specifications which require a gas-exit cross-section which is as close is possible to a plane perpendicular to the axis of the engine.

A thrust reverser is known moreover from EP-A-0 774 578, comprising two shells in which cut-outs are formed allowing the shells to deflect and to come face-to-face in reversal mode, in such a way that the mid-parts of the downstream edges of the shells, with the beams to which the shells are articulated, form a cowling edge in the form of a discontinuous circle.

The main drawback of this known structure is that the cut-outs formed in the shells create geometric discontinuities on the exit cross-section of the reverser, having a negative effect on the efficiency of the engine in forward-thrust mode.

The present invention intends to remedy this drawback and is characterized, to this end, in that the downstream end of each of the beams includes lateral protrusions on either side of the longitudinal axis thereof, and in that, in doors-stowed position or forward-thrust position, the distance between the mid-part of the downstream edges of the said doors and the plane perpendicular to the axis of the engine passing through the axes of articulation of the doors, is equal to the distance separating the said perpendicular plane and the downstream ends of the lateral beams, so that the mid-parts of the downstream ends of the doors and the downstream ends of the beams constitute a cowling edge through which the gases exit, which is at the same time substantially circular and substantially continuous, this assembly being contained in a plane parallel to the plane passing through the axes of pivoting of the doors.

In order to obtain a gas-exit cross-section in forward-thrust mode as indicated above, one specific embodiment of the invention makes provision, in doors-stowed position, that:

the outline, or first outline, of the plane containing the mid-part of the downstream edges of each door on a reference plane consisting of the vertical plane containing the axis of the engine, and the outlines, or second and third outlines, on this same reference plane, of the planes containing the lateral parts of the downstream edge of the said doors respectively together define an isosceles triangle the base of which consists of a part of the said first outline and the vertex of which is situated on the upstream side with respect to the said first outline, the equal angles of the said isosceles triangle being less than 40°, and preferably about 30°.

The consequence of this arrangement is that, in doors-deployed position (reversal position), the downstream edges of the doors, which come to block off the channel, form, between their opposing mid-parts, an elongate aperture through which a small part of the gas flow escapes along the axis of the engine.

Moreover, the downstream end of each of the beams, on either side of the longitudinal axis thereof, includes symmetric lateral protrusions, the distance separating the end of the protrusions of the same beam being greater than the distance separating the two adjacent axes of the doors on the said beam.

An embodiment of the invention will now be described, by way of non-limiting example, by reference to the attached drawings in which.

Figure 1:
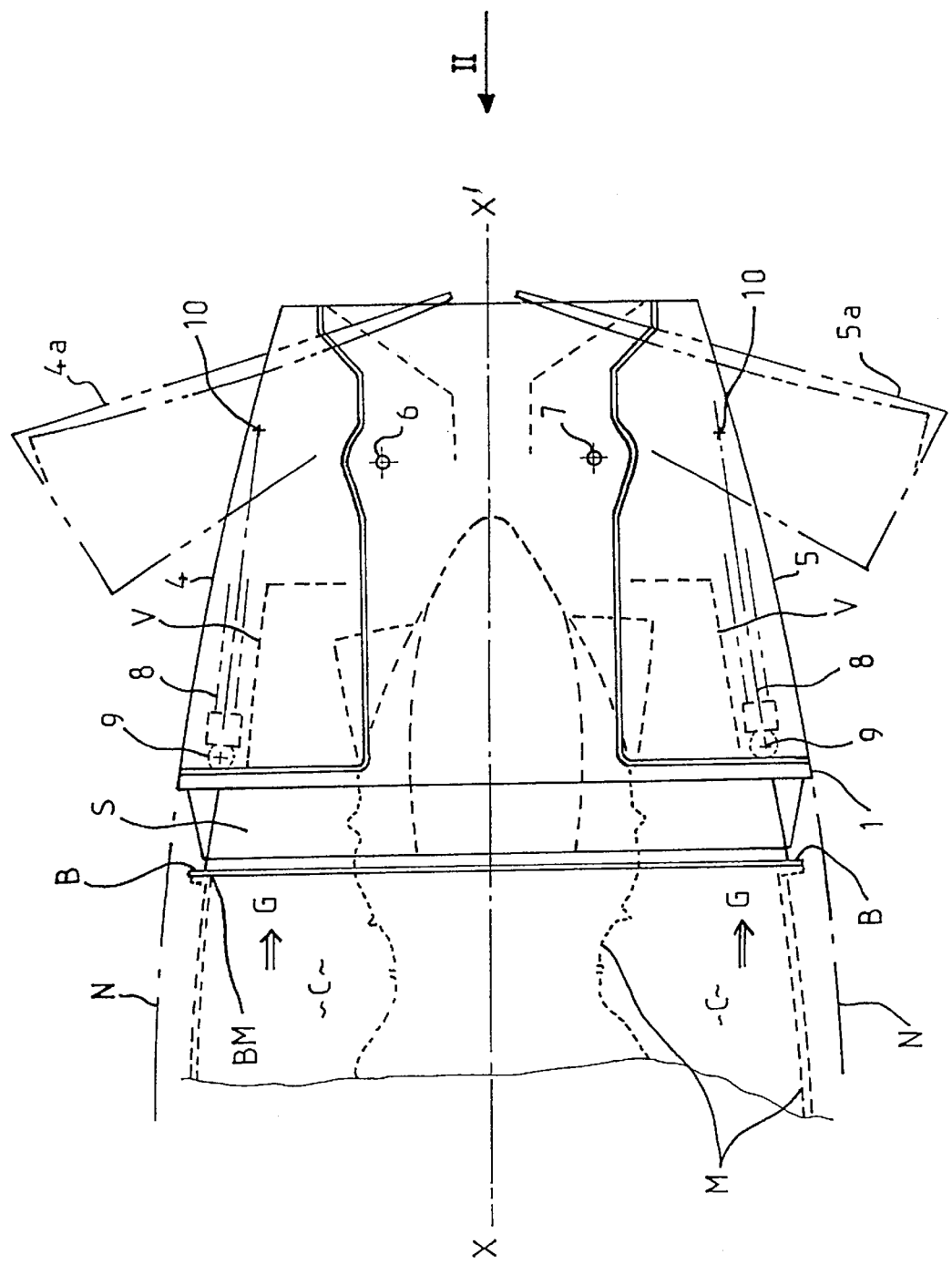
FIG. 1 is a diagrammatic side view of the aft section of an aircraft engine nacelle including a gas-ejection structure according to the invention.

In the example which follows reference will be made to a bypass jet engine, that is to say an engine in which the power plant generates a flow of hot gases, while a fan, situated upstream of the engine, delivers a cold annular flow in the same direction as the hot flow. In FIG. 1, the aft section of a conventional nacelle N enclosing the engine M has been represented. In the other attached figures, it is deliberately only the aft section of the nacelle which has been represented. The central axis of the engine has been indicated as X-X', and the direction of flow of the gases from upstream downwards within a channel C has been indicated by the arrows G. The aft section includes a fixed structure S which is fixed to the rear flange BM of the engine and comprises a flange B, a shroud V, a frame 1 and two lateral beams 2 and 3 extending from the frame 1 downstream parallel to the axis X-X'and symmetrically with respect to it. The shroud V which constitutes the upstream part of the gas-exit nozzle is surrounded by a cowling designated overall as K (FIG. 3) and constituting the outer casing of the channel C. This cowling K consists, in forward-thrust position represented in continuous line in FIGS. 1, 3 and 4, on the one hand, of the two lateral beams 2 and 3 and, on the other hand, of two rear doors 4 and 5 in the shape of a conical section. The doors 4 and 5 are mounted so as to move about respective axes 6, 6a and 7, 7a (FIG. 2) on the beams 2 and 3 in such a way as to be able to pivot, under the action of jacks 8 coupled, on the one hand, at 9 to the fixed structure S and, on the other hand, at 10 to the inside of each of the doors, between a stowed position represented in continuous line in FIG. 1, corresponding to the operation of the engine in forward-thrust mode, and a deployed position corresponding to operation in thrust-reversal mode, represented in broken line at 4a and 5a of FIG. 1.

Each of the doors has an upstream edge 11, 12 and a downstream edge designated overall as 13 and 14. These downstream edges 13 and 14 have a specific shape as can be seen particularly in FIGS. 2, 4 and 5. This is because the mid-part 13b, 14b of these edges is set back with respect to the plane containing the lateral parts 13a, 14a in such a way that, in doors-stowed position, the mid-parts 13b, 14b are aligned in the plane containing the downstream-end edges 16 and 17 of the lateral beams 2 and 3. Expressed more precisely, in doors-stowed position, the outline tP2 of the plane P2 containing the mid-part 13b, 14b of the downstream edges 13, 14 of each door 4, 5 on the plane of the drawing page and the outlines tP3, tP3', on this same plane, of the planes containing respectively the lateral parts 13a, 14a of the downstream edge of the said doors together define an isosceles triangle the base of which consists of a part of the said first outline tP2 and the vertex of which is situated on the upstream side with respect to the said first outline tP2. The value of the equal angles A of the isosceles triangle depends on the inclination of the lateral edges 13a, 14a with respect to the vertical plane which contains the mid-parts 13b, 14b; in the example represented, these angles have a value of about 30° and are, in any event, less than 40°.

Figure 4:
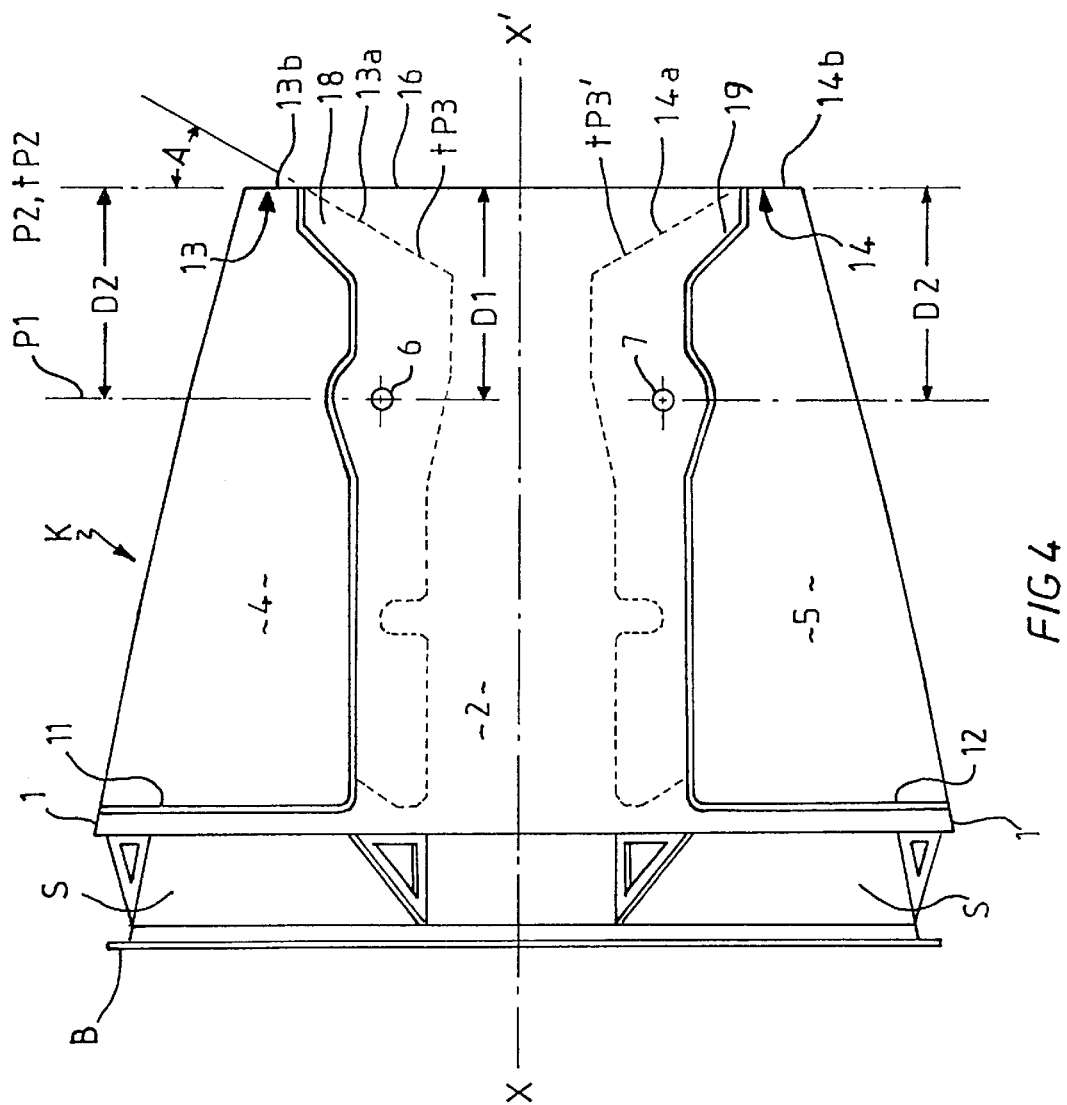
FIG. 4 is a profile view of the gas-ejection structure in the position of FIG. 3, the vertical plane containing the axis of the engine being coincident with the page of the drawing.

As can be seen clearly in FIG. 4, in doors-stowed position, the plane 2 containing the regions 13b, 14b and the edges 16, 17 is parallel to the plane P1 passing through the axes of articulation 6, 7, 6a, 7a of the doors on the beams 2 and 3, the distance D1 between the edges 16, 17 and the plane P1 being equal to the distance D2 separating the set-back regions 13b, 14b from the said plane P1. Thus, in forward-thrust position, a gas exit cross-section is obtained which is planar, substantially circular and substantially continuous.

At their downstream end, each of the beams 2, 3 exhibits two symmetric protrusions, respectively 18, 19 and 20, 21, extending laterally from the said beams (see FIGS. 4, 5 and 6), these protrusions making it possible to reduce the length of the set-back regions 13b, 14b of the doors. As can be seen in FIG. 6, the distance L1 separating the ends of the protrusions 18, 19 of the same beam 2 is greater than the distance L2 separating the adjacent axes 6, 7 of pivoting of the doors.

Figure 2:
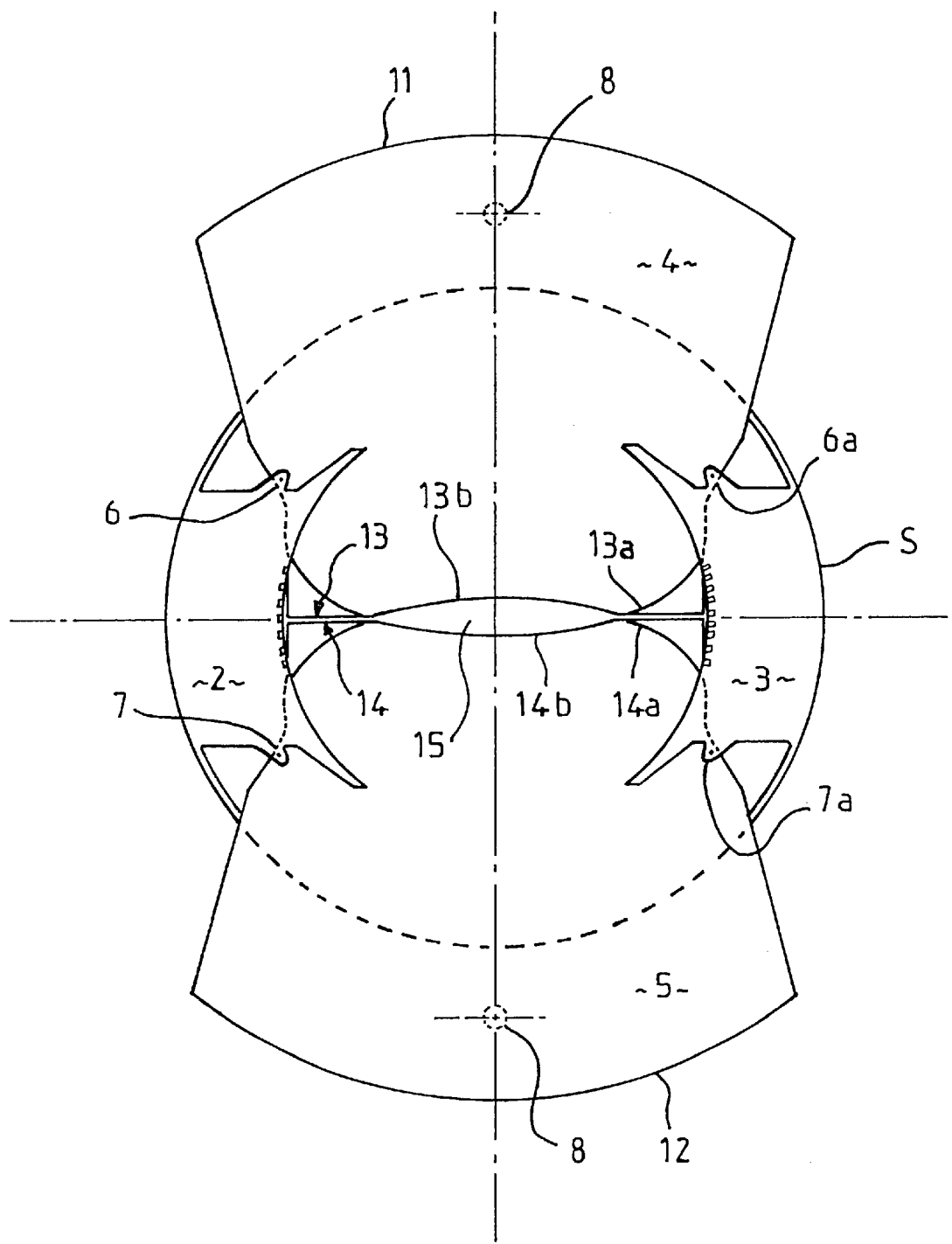
FIG. 2 is a rear view along the arrow II of the gas-ejection structure of FIG. 1 in doors-deployed position or thrust-reversal position.
Figure 3:
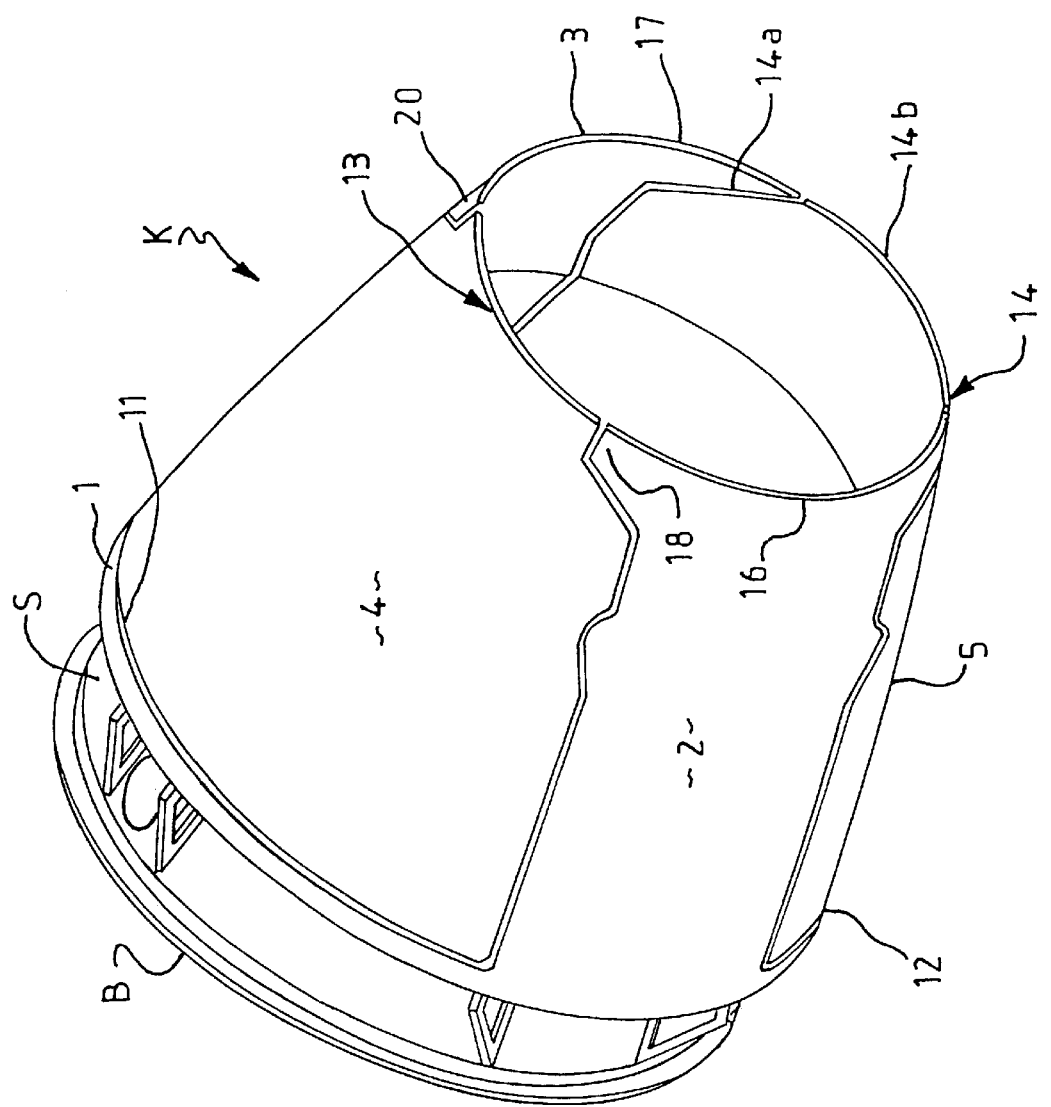
FIG. 3 is a perspective view of the gas-ejection structure, the doors being represented in the stowed position or forward-thrust position.
Figure 5:
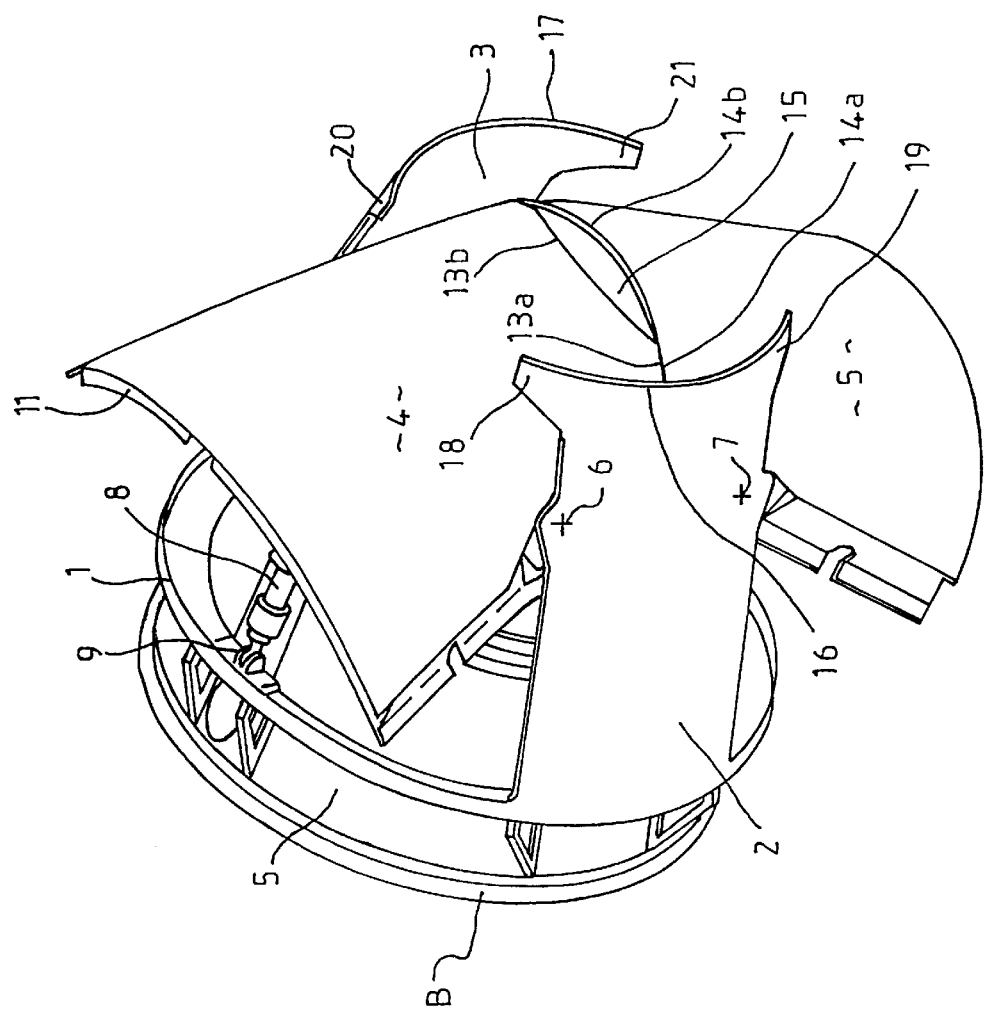
FIGS. 5 and 6 are respectively a perspective view and a profile view of the gas-ejection structure, the doors being represented in deployed position or thrust-reversal position.
Figure 6:
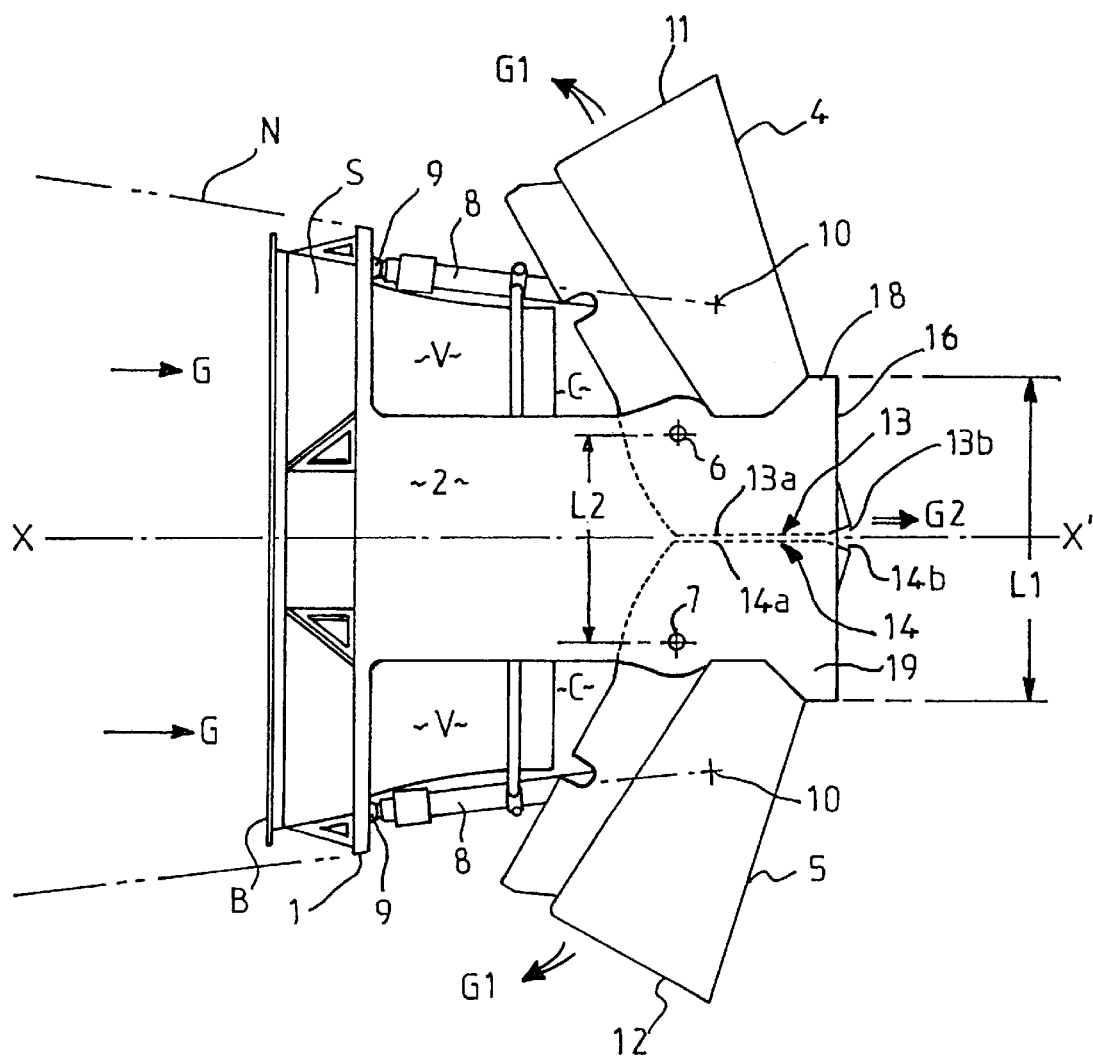

In doors-deployed position, for thrust reversal as represented in FIGS. 2, 5 and 6, the jacks 8 hold the said doors so as to bring the edges 13a, 14a close to one another, without them bearing on one another, however. The mid-parts 13b, 14b form an elongate aperture 15 (FIG. 5) between them. In this situation, although the majority of the gas flow G is actually deflected laterally and upstream by the doors in the direction of the arrows G1 (FIG. 6), a small fraction of the flow continues to be ejected in forward-thrust mode along the arrow G2 through the elongate aperture 15. However, this leak G2, of the order of less than 10% of the overall volume of the gas flow, does not significantly reduce the braking effort generated by the thrust reverser of the invention. In any event, in this type of reverser acting on the two flows of the engine, there is no particular difficulty posed in obtaining sufficient braking force, and the slight reduction in the effectiveness of the reverser corresponding to the leak G2 is entirely acceptable.

It emerges from the foregoing that, without any annular structure (shroud) being attached to the rear of the doors, a gas-exit cross-section in forward-thrust mode is available which is planar and substantially circular, which eliminates the harmful effects on the thrust of the engine in forward-thrust mode. The device according to the invention has the further advantage of reducing the length of the aft section of the nacelle while allowing reverser doors of sufficient length to be installed.

The reduced length of the aft section entails a reduction in the internal and external friction drag and a reduction in the mass particularly with respect to reversers with a fixed rear shroud.

What is claimed is:

1. A gas-ejection structure for a jet aircraft engine equipped with a thrust-reverser assembly in which the structure of the engine is surrounded by an external cowling which delimits a channel for ejecting the propulsion gases, the thrust-reverser assembly including two doors each having an upstream edge and a downstream edge, by reference to the direction of flow of the gases, the said doors being arranged downstream and each being mounted pivoting about axes of articulation between:

a stowed position in which, in association with two fixed lateral beams which are symmetric with respect to the axis of the engine, they contribute to defining the said outer cowling, the two lateral beams, onto which the said doors are articulated, forming part of a fixed structure and including downstream ends which are independent and spaced apart from one another, and a deployed position in which the said doors clear a passage in the cowling for reversal of the gases while blocking off the channel, the distance between the mid-parts of the downstream edges of the said doors and the plane perpendicular to the axis of the engine and passing through the said axes of articulation is equal to the distance (D1) separating the said perpendicular plane and the said downstream ends of the lateral beams, wherein the downstream end of each of the beams (includes lateral protrusions on either side of the longitudinal axis thereof, so that the mid-parts of the downstream ends of the doors and those of the beams constitute a cowling edge which is at the same time substantially circular and substantially continuous.

2. A gas-ejection structure according to claim 1, wherein, in doors-stowed position:

the outline, or first outline, of the plane containing the mid-part of the downstream edges of each door on a reference plane consisting of the vertical plane containing the axis of the engine, and the outlines, or second and third outlines, on this same reference plane, of the planes containing the lateral parts of the downstream edge of the said doors respectively together define an isosceles triangle the base of which consists of a part of the said first outline and the vertex of which is situated on the upstream side with respect to the said first outline, the equal angles of the said isosceles triangle being less than 40°, and preferably about 30°.

3. A gas-ejection structure according to claim 1, wherein, on the same beam, the distance separating the ends of the said protrusions is greater than the distance separating the two adjacent axes of articulation of the doors.

* * * * *